United States Patent
Kumar et al.

(10) Patent No.: US 6,173,087 B1
(45) Date of Patent: Jan. 9, 2001

(54) MULTI-VIEW IMAGE REGISTRATION WITH APPLICATION TO MOSAICING AND LENS DISTORTION CORRECTION

(75) Inventors: Rakesh Kumar, Monmouth Junction; Harpreet Singh Sawhney, Cranbury; James Russell Bergen, Hopewell, all of NJ (US)

(73) Assignee: Sarnoff Corporation, Princeton, NJ (US)

( * ) Notice: Under 35 U.S.C. 154(b), the term of this patent shall be extended for 0 days.

(21) Appl. No.: 08/966,776

(22) Filed: Nov. 10, 1997

Related U.S. Application Data
(60) Provisional application No. 60/030,892, filed on Nov. 13, 1996.

(51) Int. Cl.$^7$ ................................................ G06K 9/36
(52) U.S. Cl. ............................ 382/284; 382/294
(58) Field of Search ............................ 382/284, 287, 382/294, 130; 358/450; 345/335

(56) References Cited

U.S. PATENT DOCUMENTS

| | | | |
|---|---|---|---|
| 4,644,582 | * 2/1987 | Morishita et al. | 382/130 |
| 5,187,754 | 2/1993 | Currin et al. | 382/54 |
| 5,566,251 | 10/1996 | Hanna et al. | 382/284 |
| 5,649,032 | * 7/1997 | Burt et al. | 382/284 |
| 5,657,402 | 8/1997 | Bender et al. | 382/284 |
| 5,768,439 | * 6/1998 | Suzuka et al. | 382/284 |

OTHER PUBLICATIONS

Mosaic Based Representations of Video Sequences and Their Applications, Michal Irani, P. Anandan and Steve Hsu. IEEE, Aug. 1995, pp. 605–611.

Model–based 2D&3D Dominant Motion Estimation for Mosaicing and Video Representation, Harpreet S. Sawhney Serge Ayer, Monika Gorkani. IEEE, Aug. 1995, pp. 583–590.

Image Warping for Calibration and Removal of Lens Distortion, G.F. McLean IEEE May 1993, pp. 170–173.

Representation of Scenes from Collections of Images, Rakesh Kumar, P. Anandan, Michal Irani, James Bergen, Keith Hanna, IEEE, 1995, pp. 10–17.

* cited by examiner

*Primary Examiner*—Yon J. Couso
(74) *Attorney, Agent, or Firm*—William J. Burke

(57) ABSTRACT

An embodiment of the invention is a system and process for true multi-image alignment that does not rely on the measurements of a reference image being distortion free. For instance, lens distortion is a common imaging phenomenon. When lens distortion is present, none of the images can be assumed to be ideal. In an embodiment of the invention, all the images are modeled as intensity measurements represented in their respective coordinate systems, each of which is related to a reference coordinate system through an interior camera transformation and an exterior view transformation. Motion parameters determined in accordance with an embodiment of the invention dictate the position of the input frames within the reference frame. A reference coordinate system is used, but not a reference image. Motion parameters are computed to warp all input images to a virtual image mosaic in the reference coordinate system of the reference frame. Each pixel in the virtual image mosaic may be predicted by intensities at corresponding pixel positions from more than one image. The error measure, which is the sum of the variances of predicted pixel intensities at each pixel location summed over the virtual image mosaic, is minimized. The embodiment of the invention advantageously maximally uses information present in all images.

27 Claims, 12 Drawing Sheets

FIG. 7
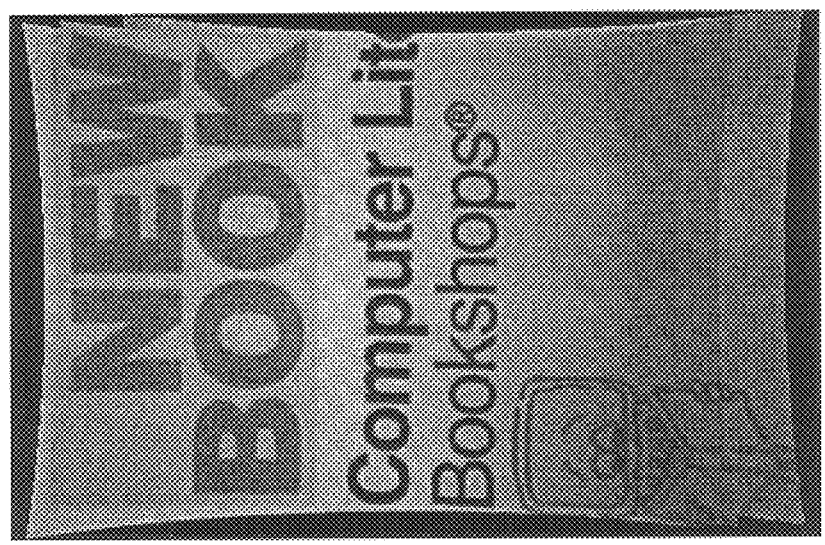
FIG. 10

MULTI-VIEW IMAGE REGISTRATION WITH APPLICATION TO MOSAICING AND LENS DISTORTION CORRECTION

This application is a non-provisional application based on Provisional Application Ser. No. 60/030,892, filed Nov. 13, 1996.

BACKGROUND OF THE INVENTION

1. Field of the Invention

The present invention generally relates to the field of image processing and, more particularly, to the use of references to construct a mosaic.

2. Description of the Related Art

Multiple images of a scene are related by a set of motion transformations. Given these transformations, the images may be warped to a central coordinate system and merged to construct an image mosaic. See for example commonly owned and copending applications Ser. Nos. 08/339,491, filed Nov. 14, 1994, entitled SYSTEM FOR AUTOMATICALLY ALIGNING MOSAICS TO FORM A MOSAIC IMAGE; 60/021,295, filed Jul. 17, 1996, entitled METHOD AND APPARATUS FOR MOSAIC IMAGE CONSTRUCTION; 08/493,632, filed Jun. 22, 1995, entitled METHOD AND SYSTEM FOR IMAGE COMPENSATION USING A PARALLAX BASED TECHNIQUE and 60/015,577, filed Apr. 18, 1996, entitled COMPUTATIONALLY EFFICIENT DIGITAL IMAGE WARPING, each of which is incorporated by reference herein in its entirety. As a part of the alignment process, it is also possible to recover scene information such as 3D parallax and the motion of independently moving objects. Discrete feature correspondence based and direct gradient based methods have been used to compute the motion transformations. However, in all the traditional techniques, especially the ones relying on direct intensity gradients, one image and its coordinate system have been assumed to be ideal and distortion free.

SUMMARY OF THE INVENTION

The present invention involves a method and system for multi-view image registration. The invention includes receiving a plurality of images and establishing an ideal coordinate system. Subsequently, the received images are processed to relate the images to the ideal coordinate system without using a reference image; and, finally, the processed images are used for constructing a mosaic.

BRIEF DESCRIPTION OF THE DRAWINGS

The following detailed description will be more fully understood with reference to the accompanying drawing in which:

FIG. 7 shows a mosaic of the three frames shown in FIG. 4 in accordance with the invention;

FIG. 10 shows a document mosaic after compensation for lens distortion and projective transformation in accordance with an embodiment of the invention;

DETAILED DESCRIPTION

An embodiment of the invention is a system and process for true multi-image alignment that does not rely on the measurements of a reference image as being distortion free. For instance, lens distortion is a common imaging phenomenon. When lens distortion is present, none of the images can be assumed to be ideal. In an embodiment of the invention, all the images are modeled as intensity measurements represented in their respective coordinate systems, each of which is related to a reference coordinate system through an interior camera transformation and an exterior view transformation.

Figure 1:
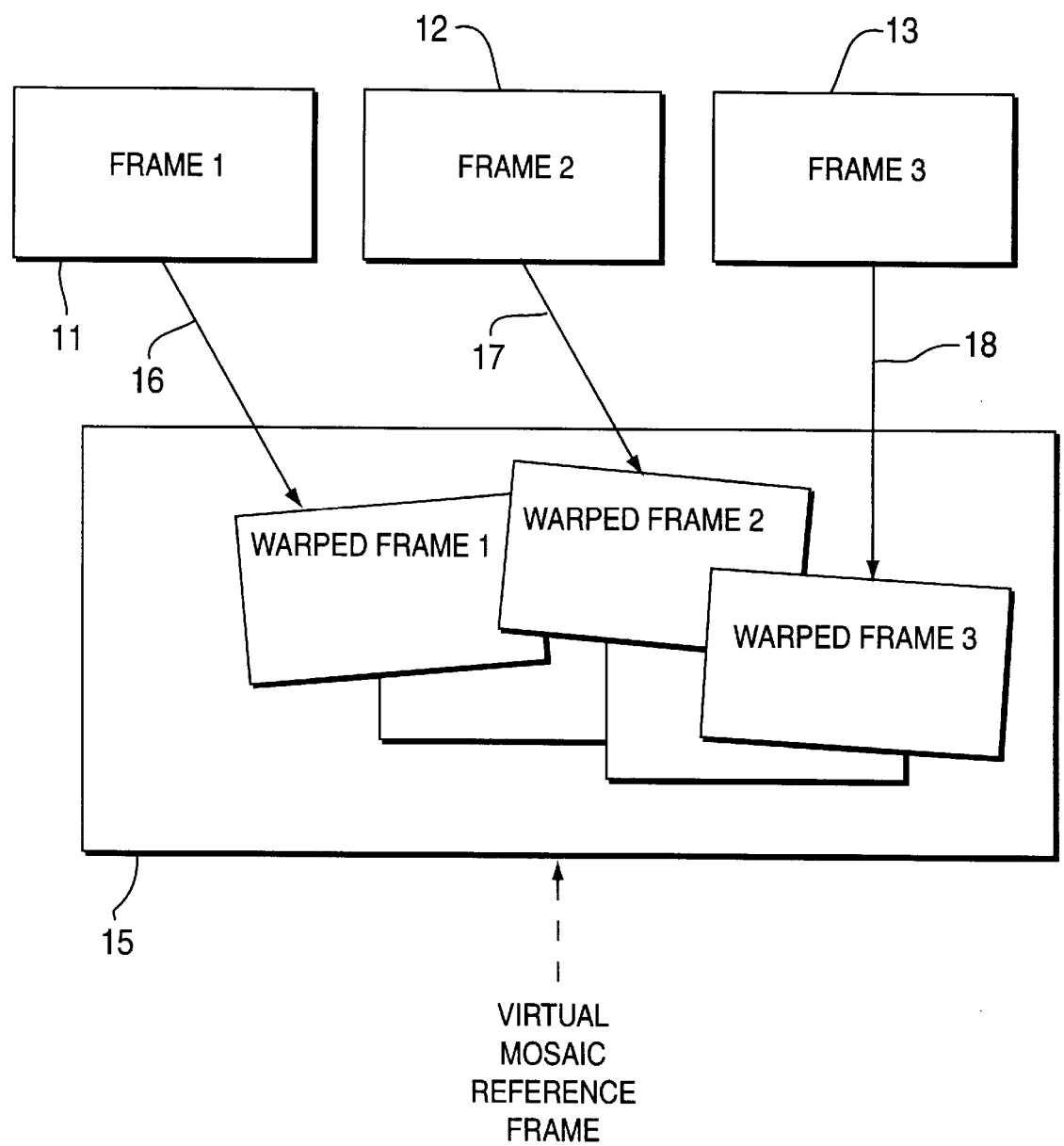
FIG. 1 is an illustration of mosaic construction in a virtual coordinate frame in accordance with an embodiment of the invention.

As shown in FIG. 1, a series of input frames 11, 12 and 13 (not limited to three as shown, however), none of which provides the coordinate system in which the final mosaic is built, are input to a virtual mosaic coordinate reference frame 15. Motion parameters 16, 17 and 18 determined in accordance with an embodiment of the invention dictate the position of the input frames within the reference frame 15.

Figure 2:
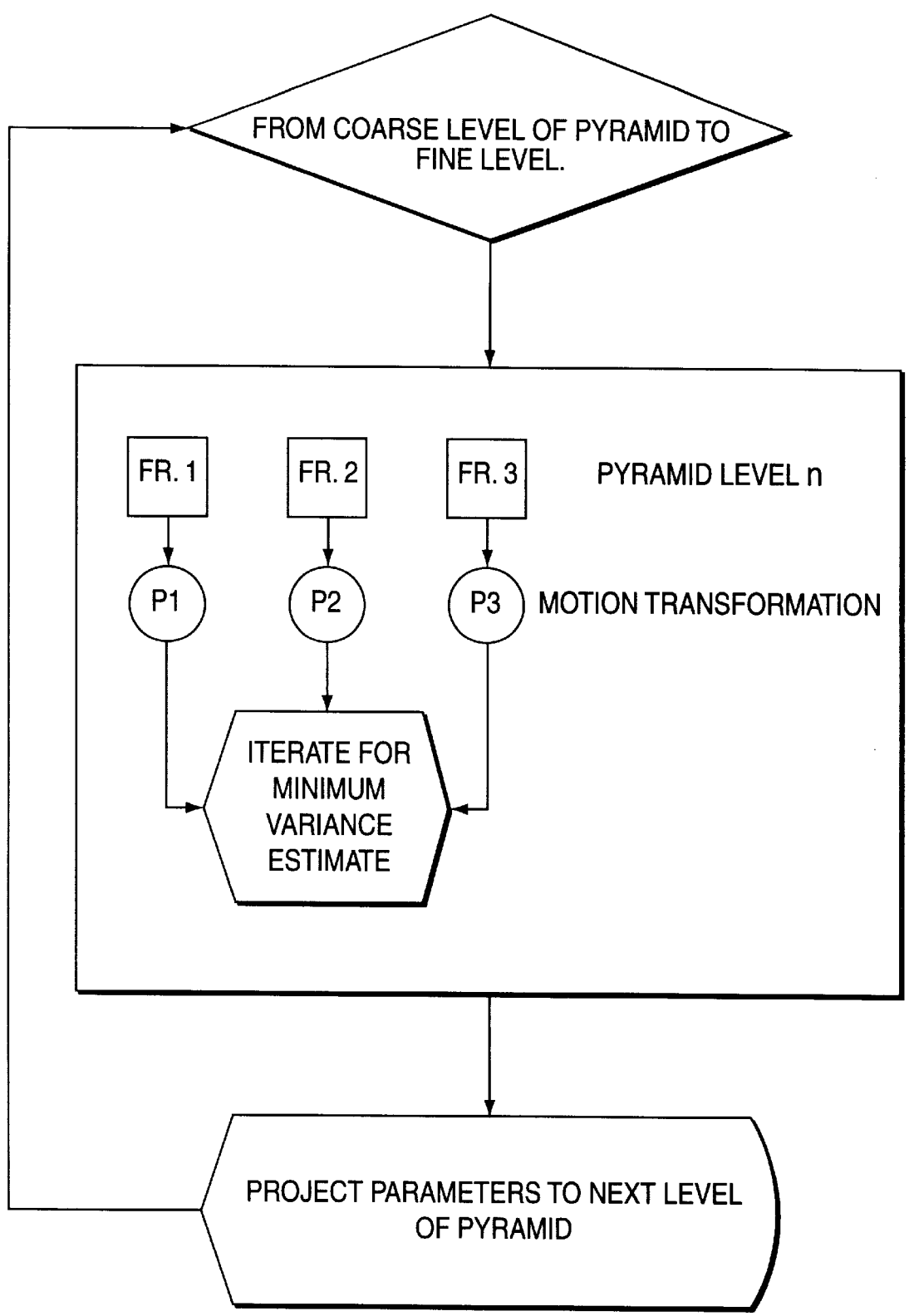
FIG. 2 is an illustration of pyramid-based coarse-to-fine minimum variance estimation of motion parameters.

Referring to FIG. 2, the computation is based on a minimum variance estimate of the ideal image that is computed using direct multi-resolution methods. A reference coordinate system is used, but not a reference image. Motion parameters are computed to warp all input images to a virtual image mosaic in the reference coordinate system of the reference frame. Each pixel in the virtual image mosaic may be predicted by intensities from more than one image. The error measure, which is the sum of the variances of predicted pixel intensities at each pixel location summed over the virtual image mosaic, is minimized. The embodiment of the invention advantageously maximally uses information present in all images.

Figure 3:
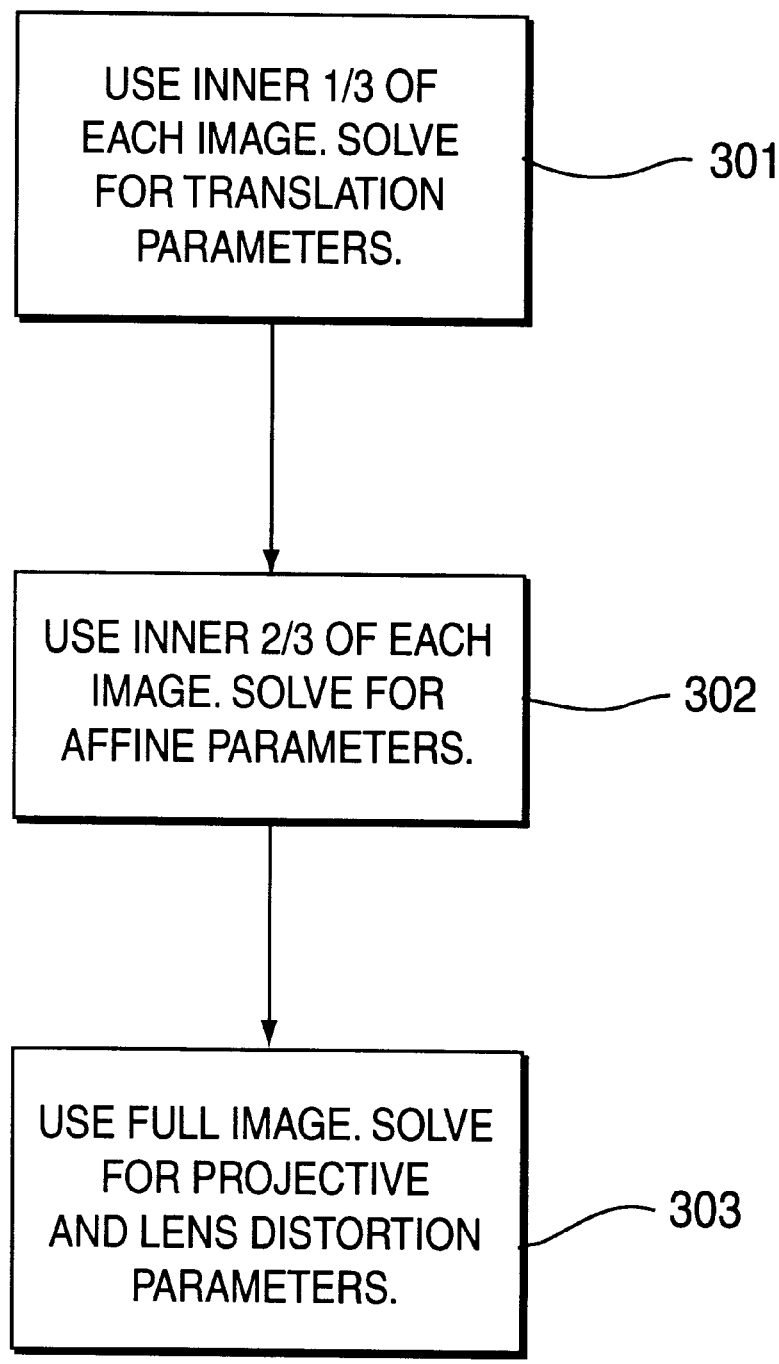
FIG. 3 is a block diagram of steps of an embodiment of the invention for estimating lens distortion parameters.

The optimization process is highly non-linear and has many local minima. An embodiment of the invention uses two strategies to reach a global minimum. As shown in FIG. 3, the first is hierarchical complexity: a series of error functions are minimized, each more complex than the previous, where the results from the previous are used as an initial estimate. For instance, radial lens distortion is very severe at the ends and corners of the image. It is not very severe at the center of the image. Therefore, in one embodiment of the present invention, only the inner ⅓ rectangle of each image is used (step 301 of FIG. 3), after which the global translation parameters (2 for each image) are derived.

Next, the results of the first step are used to solve for a set of affine parameters (6 for each image), using only the inner ⅔ size rectangle (step 302). The solution to the set of affine parameters is used to solve for the projective parameters (8 for each image) and the global lens distortion parameters (step 303). In this last step, the entire image is used.

The minimization for any set of parameters is done in a coarse-to-fine manner as shown in FIG. 2 over a set of image pyramids. For each image, a laplacian or gaussian pyramid is constructed. At each level of the pyramid, the interior and exterior camera transformations are solved which minimize the sum of variance estimates over the virtual image. This optimization is done using the Levenberg Marquardt (LM) technique. The process can be iterated until there is convergence or can be stopped after a fixed number of iterations. The results obtained at one pyramid level are projected to the next pyramid level and the whole process is iterated again. In this manner, the optimization is done in a coarse to fine manner over the pyramid.

The process has at least two applications. In a first application, the process is used to correct lens distortion. In a second application, the process can be used to create image/video mosaics from a sequence of images or documents.

Key advantages of the exemplary embodiment of the invention are: (i) not having to rely on one particular image being ideal and distortion free, (ii) being able to register images and compute coordinate transformations even when the multiple images are (or a sequence is) of an extended scene with no overlap between the first and last frame of the sequence, (iii) being able to handle linear and non-linear transformations within the same framework, and (iv) eliminating the need for an external calibration object for lens distortion correction.

FORMULATION

The multi-image formulation uses a parametric plane projective transformation with lens distortion as the underlying geometric model. This can be specialized to other parametric and non-parametric models. For example, a person having ordinary skill in the art will understand that projective transformation is the most general model and that the multi-image formulation can be modified to provide affine and translation transformations. The plane projective model with lens distortion accurately captures the image transformations from a real camera undergoing approximate rotations (pan/tilt) and zoom, and also models the other internal camera parameters.

Given images $I_1 \ldots I_N$, the coordinate system of each $I_i$ is represented as a transformed version of an ideal reference coordinate system typically not belonging to any particular image. The transformation consists (for the purposes of this formulation but not limited to) of an 8-parameter plane projective transformation and a 1 or 2 parameter lens distortion transformation. Therefore, a point (x, y) in the ideal system is related to an observed point $(x^i, y^i)$ in the ith image through a two-step transformation. In the first step, (x, y) is transformed through the plane projective transformation only to an undistorted coordinate $$(x_I^i, y_I^i)$$

through Equation set (1):

$$x_I^i = \frac{a_{11}^i x + a_{12}^i y + a_{13}^i}{a_{31}^i x + a_{32}^i y + a_{33}^i} \quad (1)$$

$$y_I^i = \frac{a_{21}^i x + a_{22}^i y + a_{23}^i}{a_{31}^i x + a_{32}^i y + a_{33}^i}$$

where $a_{11} \ldots a_{33}$ are the plane projective parameters with $a_{33}$ set to 1 without loss of generality. The coordinate $$(x_I^i, y_I^i)$$

is further transformed non-linearly using the lens distortion to obtain the observed video coordinate $(x^i, y^i)$ through Equation set (2):

$$x^i = x_I^i + \gamma_1 (x_I^i - x_C^i) r^2 \quad (2)$$

$$y^i = y_I^i + \gamma_1 (y_I^i - y_C^i) r^2$$

where $$p^i C = (x_C^i, y_C^i)$$

is the image center for the ith frame, and $$r^2 = (x_I^i - x_C^i)^2 + (y_I^i - y_C^i)^2$$

is the squared distance of $$(x_I^i, y_I^i)$$

from the center. The functional relationship between a reference coordinate (x, y) and the corresponding video coordinate can be succinctly expressed as Equation (3):

$$p^i = p_I^i + \Gamma(p_I^i; \gamma_1) \qquad p_I^i = P(p; A^i) \quad (3)$$

where $\Gamma$ and $P$ represent the functions in Equations (1) and (2), respectively. For simplicity, it is assumed that each video frame is distorted with the same lens distortion parameter $\gamma_1$. (This is not an unreasonable assumption for many real scenarios.) The above equation models only the cubic term of radial lens distortion. For most cameras, this is the most significant lens distortion term. However, the alignment technique of an embodiment of the invention disclosed herein easily can be applied to other more general sets of equations which are used for modeling the lens distortion.

Given the coordinate transformations, intensities at points $p^m$ in image $I_m$ and at $p^n$ in image $I_n$, that transform to the same reference coordinate p, are related through Equation (4):

$$I_m(p^m; p, A^m, \gamma_1) = I_n(p^n; p, A^n, \gamma_1) \quad (4)$$

However, the parameters $A^1 \ldots A^N$ and $\gamma_1$ are unknown and so is the correspondence between the points of the images. The correspondence between points in various images can be established only through the transformation of the reference coordinates in Equations (1) and (2).

In order to compute the correspondences and the unknown parameters simultaneously, an error function is formulated that minimizes the variance in intensities of a set of corresponding points in the images these points map to the same ideal reference coordinate. Formally, the optimization problem is shown in Equation (5):

$$\min_{A^1...A^N,\gamma 1} \sum_p \frac{1}{M(p)} \sum_i (I_i(p^i) - \bar{I}(p))^2, \qquad (5)$$

where point $p^i$ in frame i is a transformation of a point p in the reference coordinate system, $\bar{I}(p)$ is the mean intensity value of all the $p^i$'s that map to p, and M(p) is a count of all such $p^i$'s. Therefore, given a point p in the reference coordinates, each term in the sum in Equation (5) is the variance of all the intensity values at points $p^i$ that map to point p.

It is to be noted that if there is no non-linear distortion (as in Equation 2), then the observed coordinates of one image can be chosen as the reference coordinates. This is a special case of the above formulation in which the coordinates of all observed images are non-linearly distorted by the lens distortion.

Iterative Solution

The hierarchical complexity, coarse to fine optimization strategy described above is done in an iterative manner. For each motion model and pyramid level, iteration is done many times. In this subsection, the processes for solving the incremental parameters at each iteration step are described.

It is evident from the optimization function in Equation (5) and the transformation Equations (1) and (2) that the unknown parameters cannot be obtained in closed form. The LM technique is employed to minimize the sum of squares error functions.

In order to apply the LM technique, each term in Equation (5) is linearized. Each term is in the form shown in Equation (6) where A represents the set of all the N unknown $A^i$'s.

$$E((p^i; p); A_{\gamma_1}) = \frac{1}{\sqrt{M(p)}} (I_i(p^i) - \bar{I}(p)), \qquad (6)$$

Given a solution of the unknown parameters $A_k, \gamma_{1_k}$ at the kth step in the optimization process, each $E((p^i; p); A, \gamma_1)$ is linearized around this solution as shown in Equation (7):

$$E((p^i; p); A_{\gamma_1}) \approx E((p^i; p); A_k, \gamma_{1_k}) + \qquad (7)$$

$$\nabla E|_{A_k,\gamma_{1_k}} [\delta A^{1^T} ... \delta A^{N^T} \delta_{\gamma_1}]^T$$

$$= E((p^i; p); A_k, \gamma_{1_k}) +$$

$$\nabla E|_{A_k,\gamma_{1_k}} [\delta A^T \delta_{\gamma_1}]^T$$

$$E((p^i; p); A_k, \gamma_{1_k}) = \frac{1}{\sqrt{M(p)}} I_i(p^i(p; A_k^i, \gamma_{1_k})) -$$

$$\bar{I}(p^i(p; A_k^i, \gamma_{1_k}))$$

The first term on the right hand side in the above equation is the intensity value for image i sampled at location $p^i$ which is a forward mapping of the corresponding point p in the reference image with mapping parameters $$A_k^i, \gamma I_k.$$

The correspondences $(p^i, p)$ are not known apriori; these are known only through the mapping parameters. Given that, typically, only the forward mapping from p to $p^i$ is known, the first term can be written in terms of a warped image represented in the reference p coordinates, that is, $$I_i(p^i(p; A_k^i, \gamma I_k)) = I_i^w(p).$$

The warped image is created by computing $p^i$ for image i using p and the parameters $$A_k^i, \gamma I_k,$$

and then interpolating the known values of the image $I_i$ at integer pixel locations. Therefore, $$I_i^w(p)$$

represents the current estimate of image i represented in the reference coordinates. Also, $$\bar{I}(p^i(p; A_k^i, \gamma I_k)) = \frac{1}{M(p)} \sum_i I_i^w(p).$$

Therefore, at the kth parameter values, $$E((p^i, p); A_k^i, \gamma I_k) = I_i^w(p) - I^w(p).$$

The gradient term in the first order approximation of Equation (7) can be written as Equation (8):

$$\nabla E|_{A_k,\gamma_{1_k}} = \frac{1}{\sqrt{M(p)}} (\nabla I_i(p^i)|p^i(p; (p; A_k^i, \gamma_{1_k}) \nabla p^i|(p; A_k, \gamma_{1_k}) - \qquad (8)$$

$$\frac{1}{M(p)} \sum_i \nabla I_i(p^i)|p^i(p; A_k^i, \gamma_{1_k}) \nabla p^i|(p; A_k, \gamma_{1_k}))$$

The gradients of images are in their respective coordinate systems and are 1×2 matrices. Again, the gradient images are represented in the reference coordinate system for particular values of the unknown parameters, $A^k$, $\gamma_{1_k}$, through interpolation and warping. The gradients of the ith image's $(I_i)$ coordinate system, $p^i$ are, with respect to the unknown parameters, $A_i, \gamma_1$, evaluated at the current values $$A_k^i, \gamma I_k.$$

Each of these is a 2×(N×M+1) matrix where M is the dimension of each unknown parameter vector Ai, N is the number of images, and 1 accounts for the unknown scalar $\gamma_1$.

The gradients of the image coordinates can be expressed as:

$$\nabla (A^i, \gamma I) p^i = \nabla A^i p_I^i + \nabla (A^i, \gamma I) \Gamma(p_I^i; \gamma I).$$

The gradients are separated into those with respect to $A^i$ and those with respect to $\gamma_1$ From Equation (3), $$\nabla A^i p^i = ((1 + \gamma I r^2) I_2 + 2\gamma I [p_I^i - p^i C][p_I^i - p^i C]^T) \nabla |A^i p_I^i,$$

where $I_2$ is the 2×2 identity matrix.

Using the augmented vector Pa=[P 1]$^T$, the relationship of Equation (9) is established, where the matrix $$A^i = [A_1^{iT} A_2^{iT} A_3^{iT}]^T.$$

$$\nabla_{A^1} p_I^i = \begin{bmatrix} \frac{1}{A_3^{1T}pa}x & \frac{1}{A_3^{1T}pa}y & \frac{1}{A_3^{1T}pa}1 & 0 & 0 & 0 & -\frac{1}{A_3^{1T}pa}x_I^j x & -\frac{1}{A_3^{1T}pa}x_I^j y \\ 0 & 0 & 0 & \frac{1}{A_3^{1T}pa}x & \frac{1}{A_3^{1T}pa}y & \frac{1}{A_3^{1T}pa}1 & -\frac{1}{A_3^{1T}pa}y_I^j x & -\frac{1}{A_3^{1T}pa}y_I^j y \end{bmatrix} \quad (9)$$

Furthermore, $$\nabla \gamma_1 p^i = [p_I^i - p^i c]r^2. \text{ Let } g^i = \nabla I_i(p^i)\nabla A^i p^i$$

be a 1×M matrix, and $\gamma^i = \nabla I_t(p^i) \nabla \gamma_1 p^i$ be a scalar. Also let $\Gamma(p) = [\gamma^1 \ldots \gamma^i \ldots \gamma^N]$ be the 1×M*N matrix of all the $\gamma^i$'s, and $g = \nabla_i \gamma^i$. Then $\nabla E$ of Equation (8) can be written as:

$$\nabla E = \frac{1}{\sqrt{M(p)}}[0 \ 0 \ \ldots \ \gamma^i \ 0 \ \ldots \ 0 \ \gamma^i] - \frac{1}{M(p)}[\Gamma(p)\gamma].$$

Each iteration solves the following linear sum of squares problem using LM:

$$\sum_p \sum_i \left(E(p^i; p) + -E(p^i; p)\begin{bmatrix} d & A \\ d & \gamma \end{bmatrix}\right)^2.$$

For each point p in the reference coordinates, all the images that contain a point that maps to p contribute an equation to the system of equations corresponding to the above problem. LM iterations look for a solution that results in a reduction of the error function by making the Hessian diagonally dominant progressively if the original system leads to an increase in the error value.

In order to obtain a well-conditioned system of equations, the unknown parameters are scaled appropriately so that the Hessian remains well conditioned.

MINIMIZATION STRATEGY

In order to be able to handle a wide range of magnitudes of motion between frames, and to efficiently compute relatively large number of parameters through frame alignment, an optimization strategy is adopted that (i) uses progressively complex models of motion and (ii) uses a coarse-to-fine tracking of the model parameters.

Progressive Complexity

In order to efficiently solve for a large number of parameters (typically, 8N+1 for N+1 frames with their respective plane projective transformations and a common lens distortion parameter), it has been empirically determined that the use of models with a progressive increase in complexity is desirable. Spurious local minima are avoided and the number of iterations required is considerably reduced.

The progressive complexity strategy is to divide the optimization process into a sequence of steps. At each step, an increasingly higher parametric order motion model is inserted in equation (5) and the subsequent error function is minimized. The results from the previous step are used as an initial estimate for the next step.

The error function in equation (5) is a function of the unknown projective parameters $A_i$ and the lens distortion parameters $\gamma_1$ and the center for lens distortion $(x_C, Y_C)$. Subsets of these are chosen for the initial steps in the hierarchical complexity algorithm. The unknown projective parameters can be decomposed into the following hierarchy for estimation:

1. 2D Translation, 2 unknown parameters, $$a_{13}^i, a_{23}^i,$$

for each frame (Equation 1) (step 301).

First solve for only the translation parameters within a region of interest which is limited to an inner central square, typically ⅓ of the input images along each dimension. Pixels at the inner central square suffer from little lens distortion as compared to pixels in the outer boundaries.

2. Affine transformation, 6 unknown parameters $$a_{11}^i, a_{12}^i a_{13}^i, a_{21}^i, a_{22}^i, a_{23}^i$$

(step 302). The initial estimate from the translation step is used to solve for a set of affine parameters. The region of interest is expanded a little (to a dimension of ⅔ of the image), but still does not cover the whole image.

3. Projective, 8 parameters plus the global lens distortion parameters as in Equations 1 and 2 (Note, the projective transformation can also be modeled by 9 parameters, with the constraint that the RMS value for the 9 parameters is equal to 1.) (step 303).

Finally, use the estimated affine parameters as an initial estimate for computing the projective parameters and the lens distortion terms simultaneously. In this step, the error function is optimized over the entire input image. In some situations, step 302 may be skipped.

Coarse to Fine Minimization

In addition to the progressive complexity strategy, optimization over coarse-to-fine levels of a gaussian/laplacian pyramid is desirable in order to align frames with displacements in tens of pixels. The parameters are first estimated at the coarse level of the pyramid and the results from this level are used as an initial estimate for the next finer level of the pyramid. Typically, two strategies are combined. At the higher levels of the pyramid, typically only low order models are solved. The results from these levels are used as an initial estimate for solving the higher order models at the fine levels of the pyramid.

Experiments with Lens Distortion Correction

One of the applications of the invention for multi-image registration is for generating video mosaics of scenes or documents using off-the-shelf cheap PC cameras. Severe lens distortion is a common occurrence in most of these cameras. In order to be able to create high quality mosaics using these cameras, it is desirable to compute the lens distortion parameter(s) and correct for the distortion. The invention may be used either to compute the lens distortion parameter in an initializing phase, in which only a few frames are used, for each frame or, along with the computation of the alignment parameters.

Figure 4:
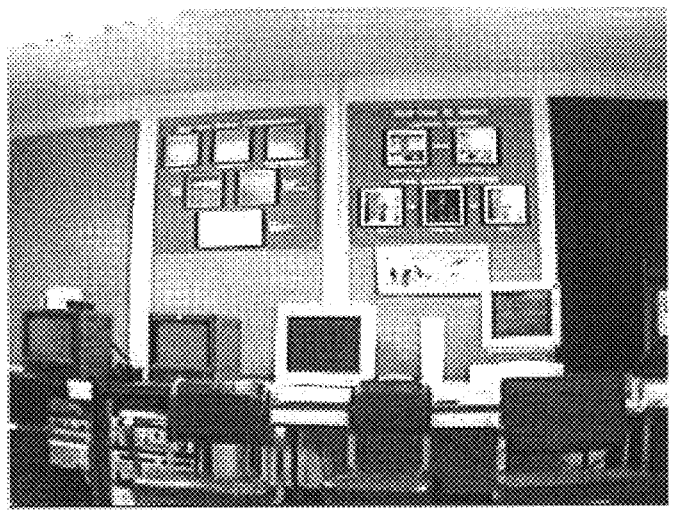
FIG. 4 shows three frames of a video sequence captured by a camera with severe lens distortion.
Figure 4:
Figure 4:
Figure 5:
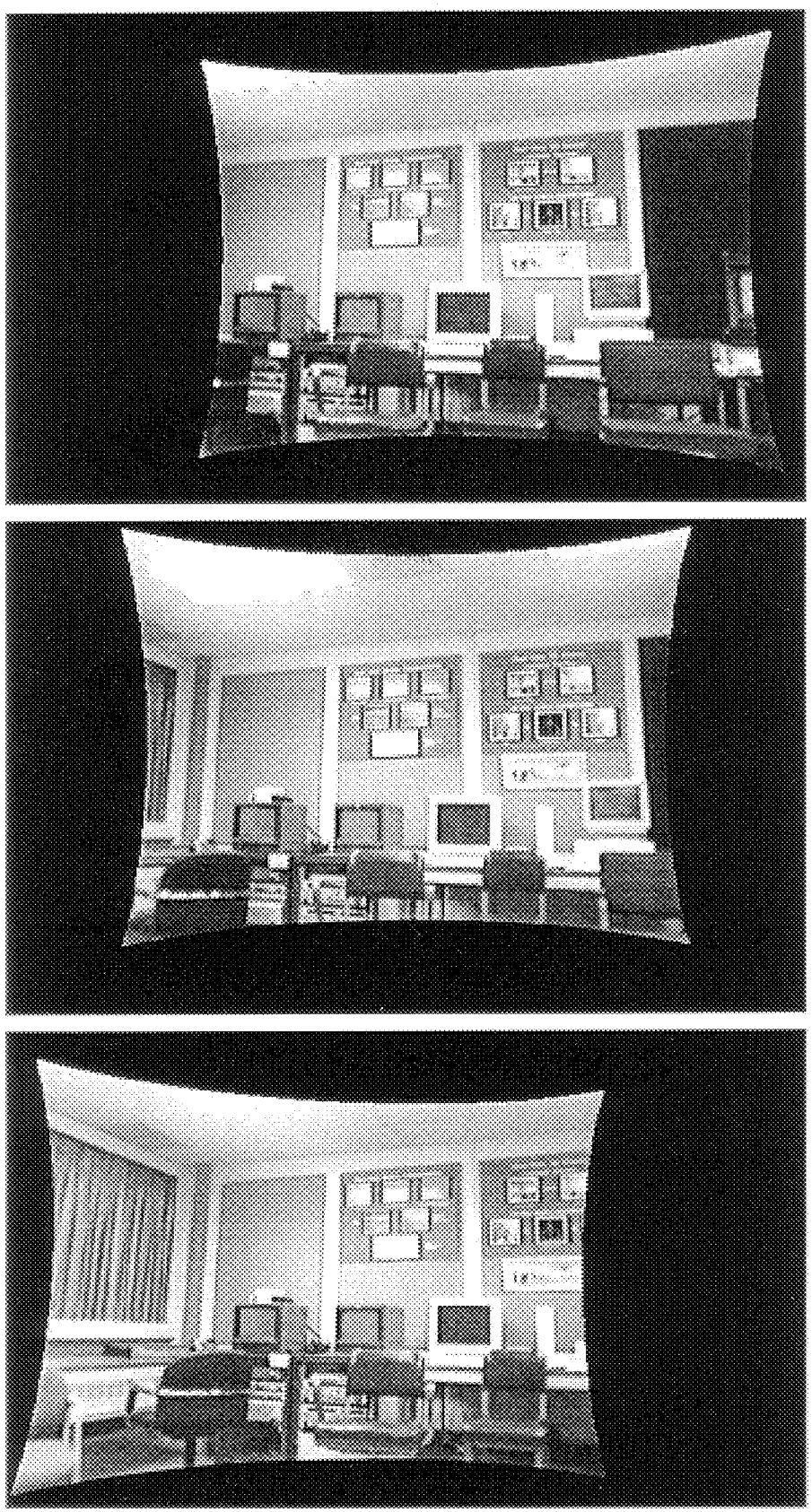
FIG. 5 shows the frames of FIG. 4 as complete warped frames in the coordinate system of the undistorted reference frame in accordance with an embodiment of the invention.

The results of computing the lens distortion parameters from a few frames are shown in FIGS. 4 and 5. In principle, two frames should be sufficient to solve for the view transformation and lens distortion. However, it has been observed that often two frames lead to local minimum solutions which can be avoided by using three frames.

Room Sequence

The first example uses a three-frame room sequence as shown in FIGS. 4–7. The sequence was acquired through a hand held, inexpensive desktop CCD camera. The effort was to capture a sequence of the complete room (about 180 degrees) through two roughly panning swipes of the camera.

Figure 6:
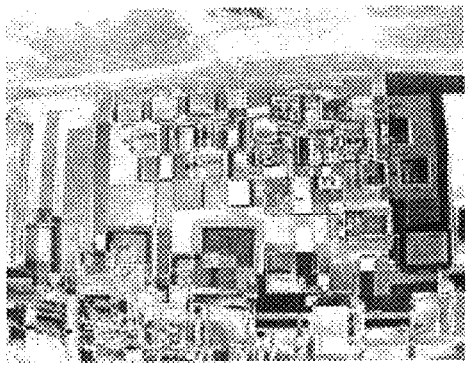
FIG. 6 shows difference images for frames differences before and after multi-frame alignment for the frames of FIG. 4.
Figure 6:
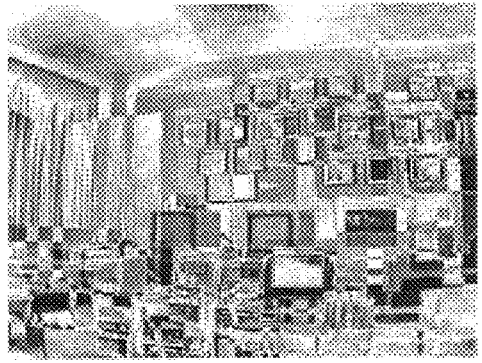
Figure 6:
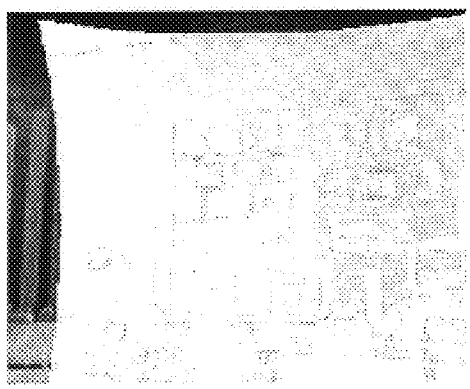
Figure 6:
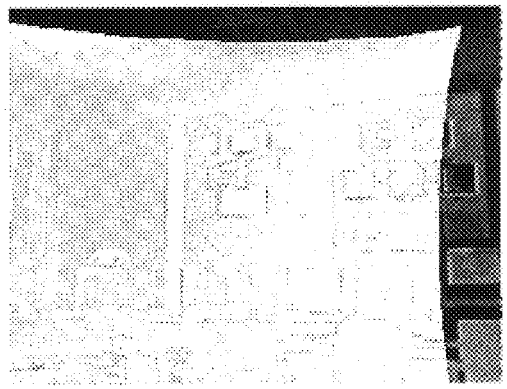

The multi-frame registration algorithm of an embodiment of the invention was applied on three frames, as shown in FIG. 5, with a plane projective and lens distortion model. The three aligned frames are shown in FIG. 5 in the undistorted coordinate system of the middle frame. The frames are shown in frames bigger than the original to show the full extent of the warping with the projective and lens distortion parameters. FIG. 6 shows the differences with respect to the reference frame before and after alignment, in the original size of the frames.

Document Sequence

Figure 8:
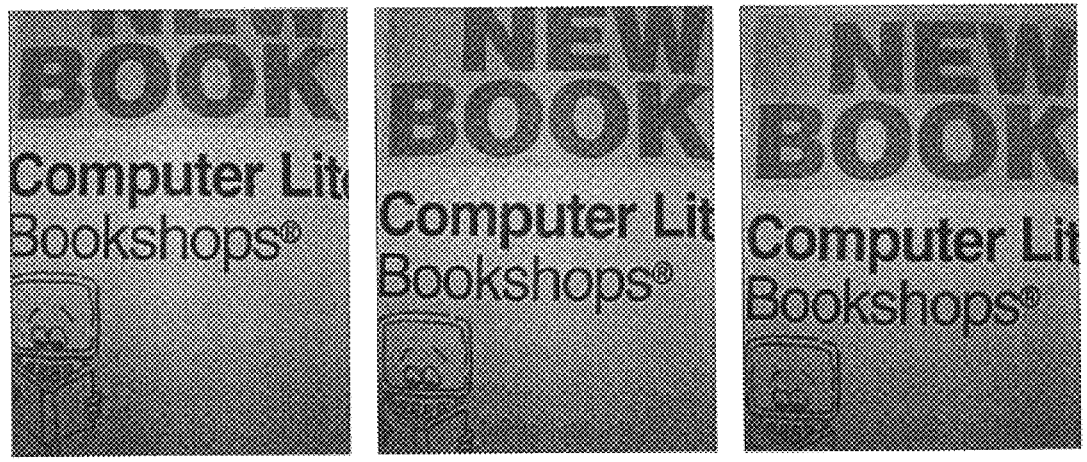
FIG. 8 shows three frames of a document captured under conditions of severe lens distortion.
Figure 9:
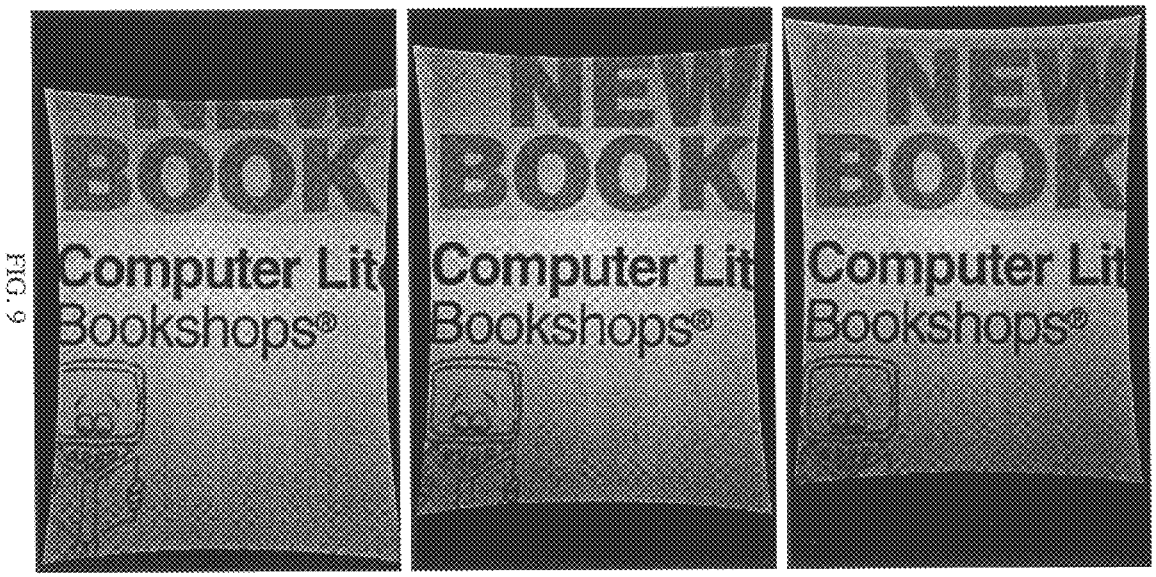
FIG. 9 shows the frames of FIG. 8 after compensation for global projective transformation and radial lens distortion in accordance with an embodiment of the invention.

Three images of a document scanned using an inexpensive "gooseneck'" camera are shown in FIG. 8. The 3D motion used to acquire the images is essentially a global y-axis translation. Since, the paper is flat, the image motion ideally would be described by a global 2D motion. However, from FIG. 8, it can be noted that there is significant radial lens distortion in the images. FIG. 9 shows the input images warped by the computed lens distortion and global projective parameters. As can be seen from the images in FIG. 9, the straight lines corresponding to page margins and sentence boundaries appear quite straight, showing effective compensation for lens distortion.

Distortion Corrected Video Mosaics

The algorithm demonstrated above may be applied over multiple frames simultaneously to register all of them in a given undistorted reference frame. Alternatively, to avoid solving for a large number of parameters simultaneously, a seed set of frames may be used to compute their view transformations and the lens distortion. Subsequently, the lens distortion may be applied as a pre-processing step to the rest of the frames. Next, the projective parameters may be solved for to align new frames with already aligned ones. An interesting issue in creating such multi-frame video mosaics is whether multiple frames should be registered to their neighbors and subsequently assimilated into a single coordinate system, or a given single frame should be aligned to the current mosaic. This issue is extremely important when mosaics of extended scenes are created by panning and tilting the camera and frames containing views of the same scene patches which may not be temporally contiguous. For instance, the room sequence was captured using two panning scans which were overlapping. Almost all existing methods have used parameters computed by consecutive frame alignment to create mosaics. FIG. 7 shows a mosaic of 8 frames of the room scene that was constructed using lens distortion correction applied to each frame and through registration of frames to an evolving mosaic. FIG. 10 shows a mosaic built using the computed transformations on the document images.

Evaluation of the Lens Distortion Model

Figure 11:
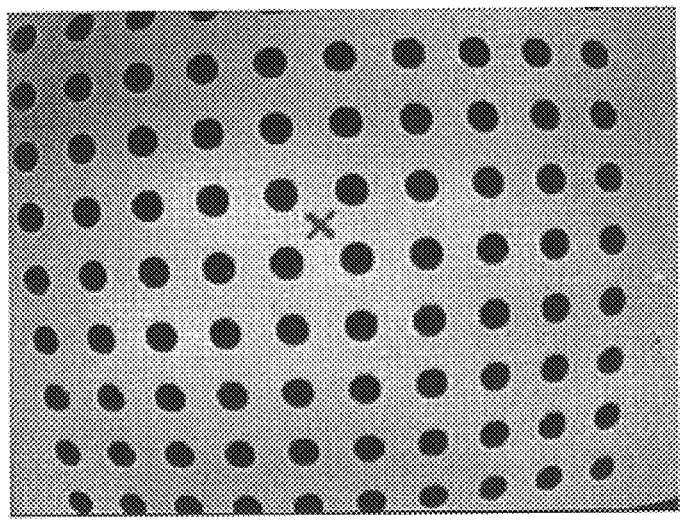
FIG. 11 shows some test patterns used in evaluating embodiments of the invention.
Figure 11:
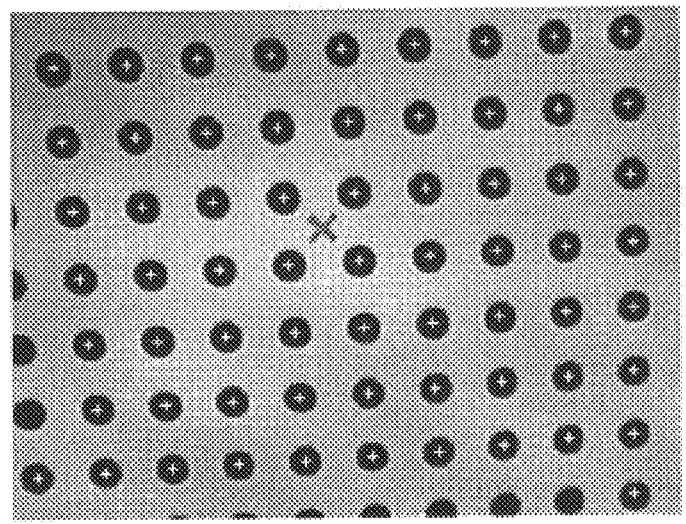
Figure 11:
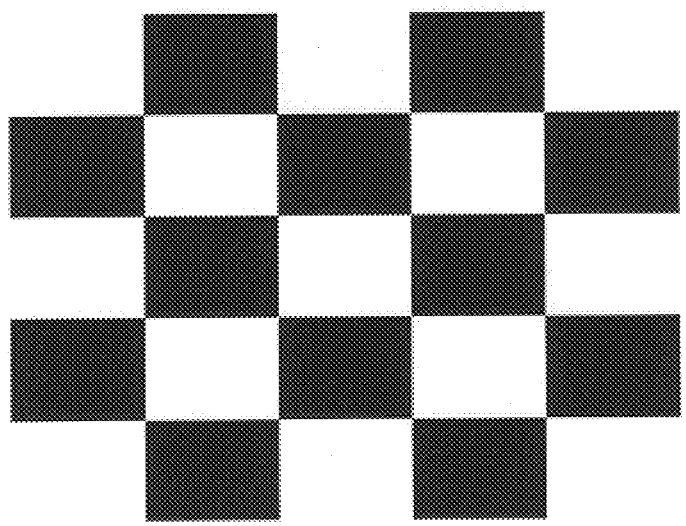

The exemplary process shown in FIG. 11 validates the lens distortion model and the multi-frame parameter estimation technique. As shown in FIG. 11, a pattern of uniform sized black circles on a white background was chosen as a test pattern. The uniform sized circles were chosen so that locating their centers and using these to compute point localization errors would be relatively easy. Using an inexpensive desktop PC camera, a number of images of this test pattern were captured by moving the camera. Subsequently, two tests were performed on the images.

First, 2 or 3 frames of the captured images (one of the images is shown in FIG. 11 were used to align the full images using four different models: (i) 2D affine, (ii) plane projective, (iii) affine with lens distortion, and (iv) plane projective with lens distortion. Each of the models were used separately to align the images using the method described earlier with different models plugged in the optimization of Equation 5. FIG. 11 also shows one frame after warping with the projective+lens distortion alignment parameters. After alignment, a template of one circular pattern was used to locate to sub-pixel accuracy the centers of all the circular patterns in each of the aligned images. The RMS error between corresponding points is reported as the achievable accuracy with the four models used.

Second, instead of using the whole images for alignment, a checker board binary mask, shown in FIG. 11, was used to compute the parameters using image data only in the white areas of the mask with the data corresponding to black areas left out. Again, after alignment with the four models with the mask, results are reported for point localization separately for points that lie in the white areas (and hence participated in the estimation process), and for points that lie in the black areas (those that are predicted by the computed parameters but did not participate in the estimation process).

| Model/Type | Estimated RMS error 64 pts. pixels | Estimated RMS error 32 pts. pixels | Predicted RMS error 32 pts. pixels |
|---|---|---|---|
| Affn. | 1.36 | 1.17 | 1.56 |
| Proj. | 0.67 | 0.64 | 0.72 |
| Affn. + LD | 0.60 | 0.57 | 0.46 |
| Proj. + LD | 0.26 | 0.39 | 0.34 |

Table 1. Estimation and prediction errors of points for various models. Optical center assumed to be at 160, 120 for the images of size 320, 240.

In a second evaluation process, the point location estimation errors are reported for various values of the image center around the nominal image center which is (160, 120) for the images used in the evaluation. The projective+lens distortion model was used to align the three grid images using our multi-frame alignment method with different but fixed values of the image center. Table 2 reports the RMS errors for points between the warped reference frame (frame 1) and the other two frames, 0 and 2, for various values of the center. The best estimation errors occur for values (160, 120) and (170, 110). In order to estimate both the center and the other parameters automatically, the two center parameters also could be unknowns in the estimation procedure. Alternatively, a search for the best center around the nominal one may be adequate. Note that in order to be able to estimate the appropriate center automatically, one must find the best estimation error for the minimum variance estimate and not for the point correspondence errors.

| Optical Center | | Frame 0–1 RMS error | Frame 1–2 RMS error |
|---|---|---|---|
| X pixel | Y pixel | 64 pts pixels | 64 pts pixels |
| 160 | 120 | 0.261 | 0.289 |
| 155 | 120 | 0.277 | 0.337 |
| 165 | 120 | 0.277 | 0.307 |
| 160 | 115 | 0.273 | 0.297 |
| 160 | 125 | 0.355 | 0.310 |
| 170 | 110 | 0.292 | 0.242 |
| 170 | 130 | 0.387 | 0.404 |
| 150 | 130 | 0.320 | 0.358 |
| 150 | 110 | 0.420 | 0.430 |
| 160 | 115 | 0.273 | 0.297 |
| 180 | 100 | 0.363 | 0.320 |
| 190 | 90 | 0.344 | 0.353 |
| 200 | 80 | 0.395 | 0.418 |

The above-described process is advantageously used in a 2D mosaic generator with application to scanning and photo applications. For example, current methods of scanning documents, scenes and photos to produce digital form images are limited by the use of special purpose scanners and/or imaging equipment that typically restrict the applicability of the devices. For instance, flat bed scanners cannot be used to scan books etc., hand held scanner cannot be used to scan a scene or snap a group photo.

Using an embodiment of the invention it is possible to scan a scene, document and/or photos using hand held ordinary cameras, camcorders, computer cameras and similar devices. The embodiment is based on automatic alignment of multiple images produced by the scanning device and blending the aligned images to create an image mosaic of the scanned images. This alignment can be accomplished in real-time using a live video camera input so that the area of the resultant mosaic image can be visualized interactively as the mosaic is created. The final image mosaic is an arbitrarily sized image (typically containing tens or hundreds of pixels on each side) and is an authentic representation of a scan of the complete document or scene. The final image can be post-processed by warping, filtering and interactive editing to produce a clear, visually pleasing rendition of the document or scene.

Previous methods of generating image mosaics have used only frame-to-consecutive-frame alignment and 1D blending to generate the final mosaics. However, in the general scanning and photo applications of an embodiment of the invention, alignment and blending in two dimensions is used to generate high quality output images.

Input

Figure 12:
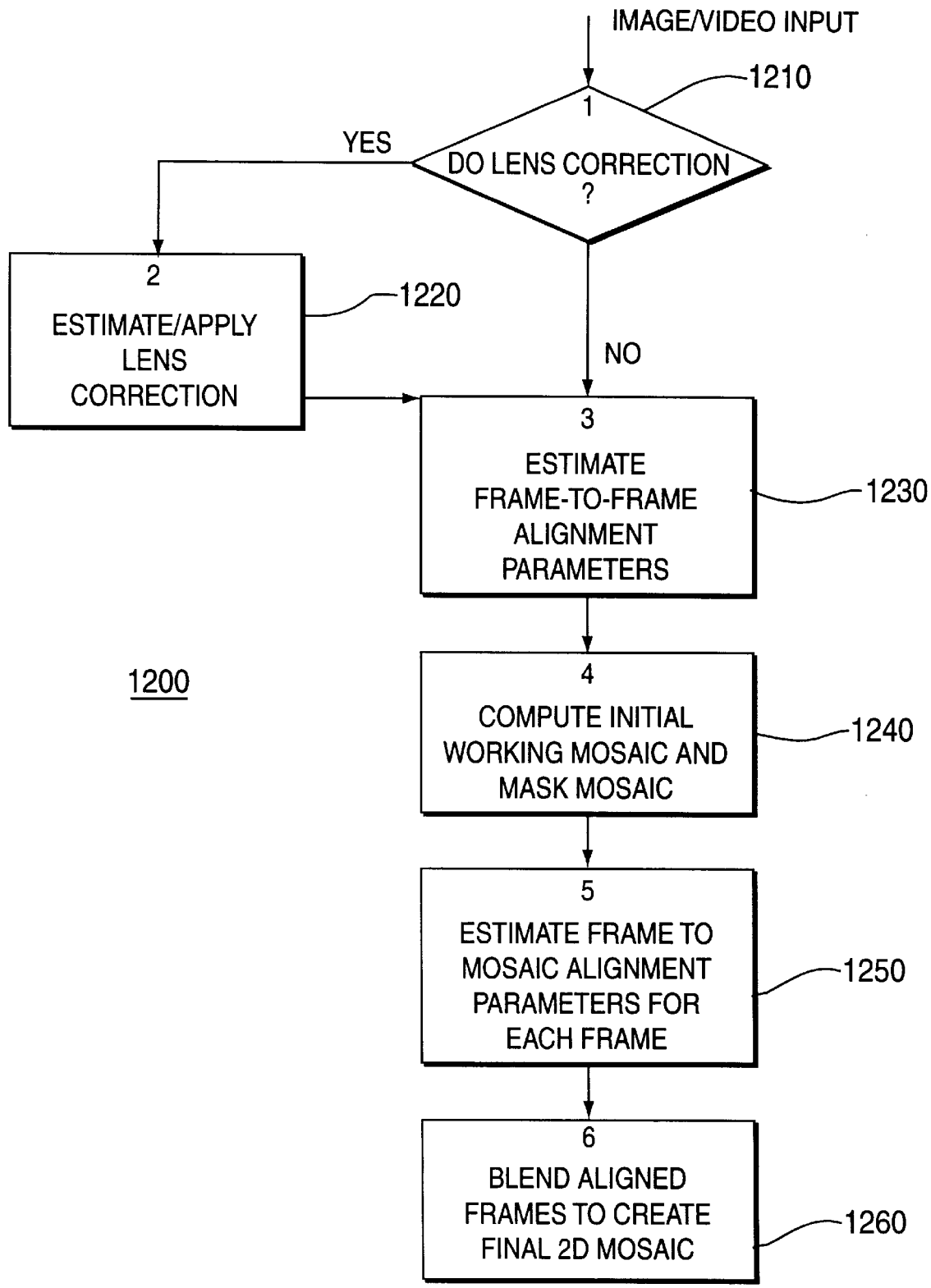
FIG. 12 is a top level flowchart of steps for generating a 2D mosaic in accordance with an embodiment of the invention.

Referring now to FIG. 12, the input images to the process (1200) may come from any of a number of imaging devices—camcorders, analog/digital output cameras, document/photo scanners, pre-existing digital files of videos or sequence of images or just a collection of scanned digital images.

Lens Distortion Estimation/Correction (steps 1210 and 1220)

In the event the input images are from a typical PC camera or other low-quality imaging device, it is likely that the images will have been affected by lens distortion from the input device. Camcorder lenses do not have noticeable distortion. Therefore estimation and correction of the lens distortion parameter(s), for example, in the manner disclosed above, is optional (step 1210 of FIG. 12) and may be applied in situations wherever necessary (step 1220). As set forth above, the technique estimates and corrects for the lens distortion without using any special calibration object as is typically done in camera calibration techniques. A small set of frames (typically 3) is used to solve for the distortion parameters.

Once the lens distortion parameter(s) are computed, they can be applied as a precorrection step to each image frame before the next step of alignment.

Frame to Frame Alignment (step 1230)

Typically successive frames of the scanned document/scene are highly correlated. This is exploited in an embodiment of the invention to compute the 2D translation (and possibly other parameters like rotation, scale and skew) that aligns the correlated parts of two successive frames. This process is repeated over all the frames in the input data until the transformation parameters for each pair of successive frames have been computed.

Copending and commonly owned application Ser. Nos. 60/021,925 and 08/339,491, identified above and incorporated by reference in their entireties herein, and U.S. application Ser. No. 08/328,783 entitled SYSTEM AND METHOD FOR ELECTRONIC IMAGE STABILIZATION, hereby also incorporated by reference in its entirety, present various satisfactory methods for frame alignment related to multi-resolution coarse-to-fine pyramid based computation of alignment parameters. These methods, in general, are good for both documents and scenes. However, for documents, there are situations when, at coarse resolutions of the pyramid, sufficient detail is not available to do proper alignment. Therefore, an embodiment of the invention provides an alternative technique that transforms document images from their mostly binary form into a gray level form in which the detail in the image is more spread out. Multiresolution information is created on these transformed images and then alignment parameters are computed.

Frame to Mosaic Alignment (steps 1240 and 1250)

Figure 13:
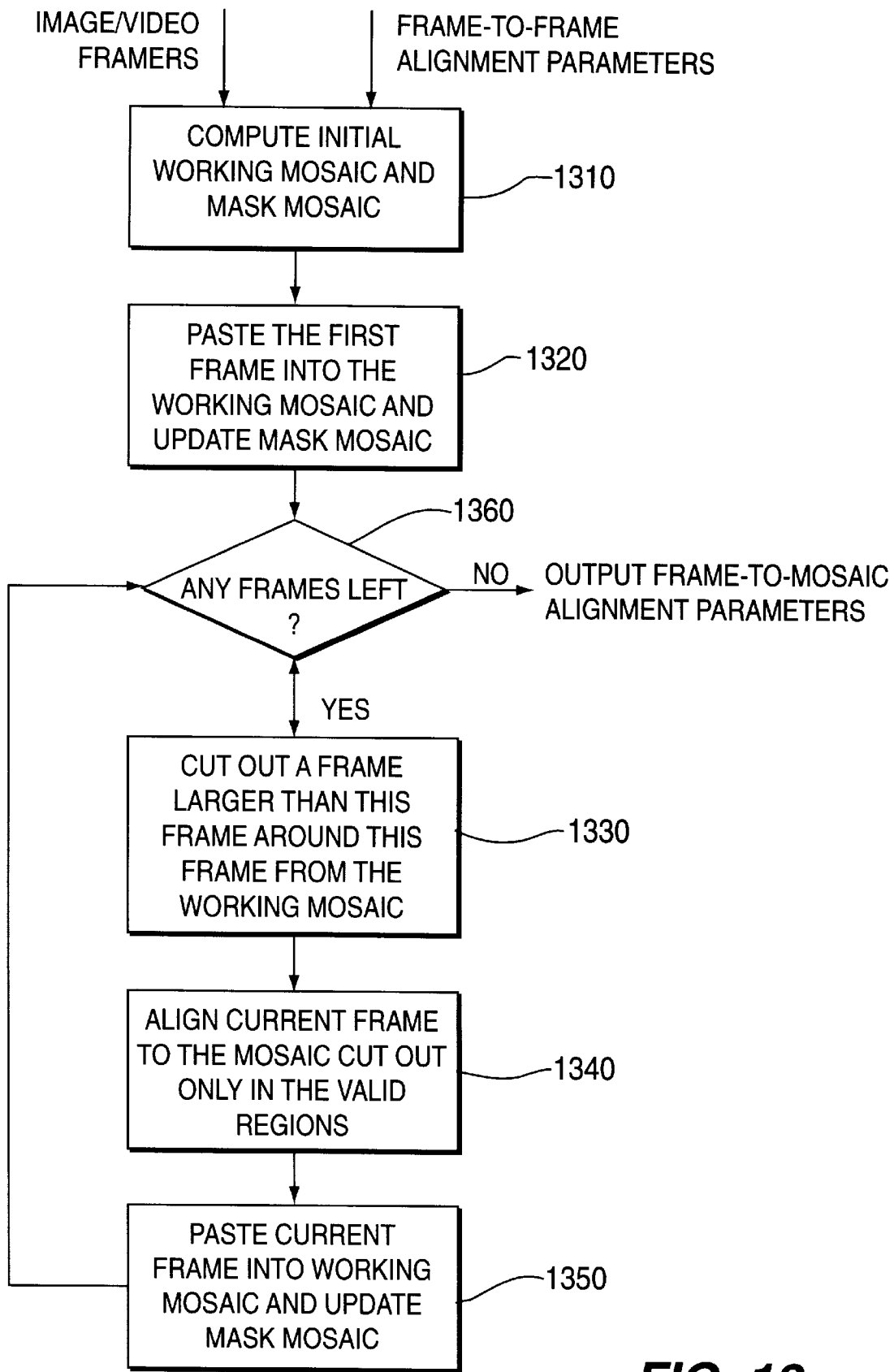
FIG. 13 is a flowchart showing a more detailed explanation of steps of the flowchart of FIG. 12.

Once the frame-to-frame transformation parameters are available, they are used to estimate the x and y extent of an intermediate working mosaic (step 1310 of FIG. 13). The working mosaic is initialized by pasting a single reference frame into the mosaic using the computed alignment parameters obtained in step 1230 in accordance with an embodiment of the invention (step 1320). Now an iterative process begins. For every new frame, there exists a partially constructed working mosaic, a mask mosaic that is the same size as the mosaic and contains valid/invalid status for each pixel, i.e., whether it is part of the working mosaic, and the transformation parameters generated in accordance with an embodiment of the invention that bring the current frame into the coordinate system of the working mosaic. Using the transformation parameters, the current frame's rectangular bounding box is mapped to the working mosaic's coordinates. A bounding box that encloses the mapped frame and includes a few tens of extra pixels on each side is created (step 1330). This bounding box is used in conjunction with the mask mosaic to create a virtual frame that contains pixels from the current working mosaic.

The current image frame is aligned to the virtual frame using 2D alignment parameters, typically rotation and translation, but more generally affine and projective parameters (step 1340). For details of this alignment technique, see U.S. applications Ser. Nos. 60/021,925; 08/339,491; 08/328,783 and 08/493,632. Using the alignment parameters determined in accordance with an embodiment of the invention, the current frame is warped and "mosaiced" into the current mosaic and the mask mosaic is accordingly updated (step 1350). The process is repeated for every frame until no frames are left (step 1360).

In order to finally align all the frames with respect to a 2D mosaic, the above steps may optionally be repeated with the working mosaic and the mask mosaic of the above stage as the initial inputs to the process. Therefore, the interactive nature of this process further reduces the dependence on the time ordering of frames.

The output image of this frame to mosaic alignment process is a working mosaic image, a mask mosaic, and a collection of alignment parameters between each of the input frames and the mosaic coordinate system.

2D Blending (step 1260)

The frame to mosaic alignment parameters provide a mapping from pixels of input frames to those of the mosaic. However, due to changes in illumination over the course of the complete scan and/or changes in the camera aperture, even when frames are aligned well geometrically, there may still be visible photometric seams between frame boundaries. The blending technique of an embodiment of the invention uses the topology of frames defined by the computed transformation parameters to blend the frames into a high quality output mosaic that eliminates seams.

The blending method first computes for each output mosaic pixel that image frame from which it will be filled. This decision is based on the observation that typically pixels close to the center of an image contain the highest detail with the least distortion. In order to capture this idea, a Voronoi tessellation is created in the mosaic coordinates with the mapped centers of each image frame as the sites. Subsequently, each mosaic pixel's corresponding image frame is efficiently determined. In the event that some of the images are affected by noise, signal loss, optical defocus, motion smear or other degradations to image information, these images (or their affected regions) can be removed from the described computation (either by automatic processing or interactive selection) to allow use of the best quality image information at each point.

Subsequently, for each image, the working mosaic without the current image is created and then the current image is pasted appropriately. Laplacian and Gaussian pyramids for regions centered at the current image including its neighbors are created. Then the region of the current image is copied into a final pyramid This is repeated for each image frame. At the end of this process, there exist the pyramids corresponding to the final blended mosaic. In order to actually construct the mosaic, starting at the coarsest level, each level is expanded and the Laplacian and Gaussian mosaics at that level are added to generate the next level. This process is repeated until a blended mosaic is available at the finest level. See U.S. applications Ser. Nos. 60/021, 925; 08/339,491 and 08/328,783 for details of this process. Following the assembly of the complete mosaic, the resulting image can be transformed by image warping to produce an output image simulating a particular observer viewpoint, to provide an undistorted panoramic field of view, or to create some other desired visual effect.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments effectively configure the microprocessor to create specific logic circuits.

It should be understood that various changes in the details, materials and arrangements of the parts which have been described and illustrated in order to explain the nature of this invention may be made by those skilled in the art without departing from the principle and scope of the invention.

We claim:

1. Method for multi-view image registration comprising the steps of:
   a) receiving a plurality of images;
   b) establishing an ideal coordinate system;
   c) processing the received images to register the images to the ideal coordinate system using none of the plurality of images as a reference image, including the steps of:
      c1) selecting at least two images from the plurality of images;
      c2) computing a plurality of motion parameters to warp the at least two images to the ideal coordinate system as at least two warped images respectively; and
      c3) minimizing an objective function that characterizes differences between the at least two warped images in the ideal coordinate system by iteratively deriving the motion parameters in a coarse-to-fine manner over a set of image pyramids to produce the further set of parameters which define the parametric transformation.

2. The method of claim 1 wherein the ideal coordinate system is related to the coordinate system of the at least two images by an affine transformation.

3. The method of claim 1, wherein step c2) includes the steps of
   selecting one image from the at least two images;
   deriving a first set of parameters which define a first parametric transformation that translates the one image to a position in the ideal coordinate system;
   iteratively deriving at least one further set of parameters that define at least one respective further parametric transformation defining the warping of the one image.

4. The method of claim 1, wherein:
   step c2 includes the steps of:
      defining a set of parametric motion models each with a particular respective functional form and number of parameters;
      deriving a parametric motion description using an initial selection from said set of models by estimating the corresponding parameters; and
      iteratively deriving the parameters for each respective further parametric motion description using further selections from said set of models the derivation of the parameters for each further parametric motion description using the parameters derived for each previous parametric motion description to provide an initial estimate of the parameters for the further parametric motion description.

5. The method of claim 4, wherein the step of deriving the parametric motion description using the initial selection from the set of models uses a first portion of each image, said first portion having a predetermined size, and the step of iteratively deriving parameters for each respective further parametric motion description uses a further portion of each image, said further portions having a size greater than or equal to the size of the portion used in the previous iteration.

6. The method of claim 1, wherein:
the step c2) includes the step of:
deriving a parametric motion description including a number of initial parameters; and
the step c3) includes the steps of:
iteratively deriving respective further parametric motion descriptions each further parametric motion description being defined by an equal or greater number of further motion parameters than are included in any previously derived parametric motion description, using the previously derived parametric motion descriptions to provide an initial estimate of the further motion parameters; and
deriving image distortion parameters using the further motion parameters derived in a final iteration.

7. The method of claim 6, wherein the step of deriving the initial motion parameters uses a first portion of each image, said first portion having a predetermined size, and each subsequent iteration uses a further portion of each image, said further portions having a size greater than or equal to the size of the portion used in a previous iteration.

8. The method of claim 3, wherein:
the step of deriving the first set of parameters includes the step of deriving global translation parameters; and
the step of iteratively deriving at least one further set of parameters includes the steps of:
deriving a set of affine parameters using the global translation parameters; and
deriving projective parameters and global lens distortion parameters using the set of affine parameters.

9. The method of claim 8, wherein the step of deriving the global translation parameters uses approximately the inner ⅓ rectangle of each image; the step of deriving the set of affine parameters uses approximately the inner ⅔ rectangle of each image; and the step of deriving the projective parameters and the global lens distortion parameters uses approximately each entire image.

10. A computer-readable medium having stored thereon a plurality of instructions, the plurality of instructions including instructions which, when executed by a processor, cause the processor to perform the steps of:
a) receiving, in digital form, a plurality of images;
b) establishing an ideal coordinate system;
c) processing the received images to register the images to the ideal coordinate system using none of the plurality of images as a reference image, including the steps of:
c1) selecting at least two images from the plurality of images;
c2) computing a plurality of motion parameters to warp the at least two images to the ideal coordinate system as at least two warped images respectively; and
c3) minimizing an objective function that characterizes differences between the at least two warped images in the ideal coordinate system by iteratively deriving the motion parameters in a coarse-to-fine manner over a set of image pyramids to produce the further set of parameters which define the parametric transformation.

11. The computer-readable medium of claim 10, wherein:
in the step c2), the plurality of instructions cause the processor to perform the step of deriving a parametric motion description including a number of initial parameters; and in step c3), the plurality of instructions cause the processor to perform the step of iteratively deriving respective further parametric motion descriptions each including an equal or greater number of motion parameters than are included in any previously derived parametric motion description, using previously derived parametric motion descriptions.

12. The computer-readable medium of claim 11, wherein in step c3) the plurality of instructions cause the processor to further perform the step of
deriving image distortion parameters using the further set of parameters derived in a final iteration.

13. The computer-readable medium of claim 11, wherein the plurality of instructions cause the processor to perform the step of deriving the initial motion parameters uses a first portion of each image, said first portion having a predetermined size, and each subsequent iteration uses a further portion of each image, each of said further portions having a size greater than or equal to the size of the portion used in the previous iteration.

14. The computer-readable medium of claim 10, wherein:
the plurality of instructions which cause the processor to perform the step c2) cause the processor to perform the steps of:
solving for global translation parameters; and
solving for a set of affine parameters using the global translation parameters; and
plurality of instructions which cause the processor to perform step c3) cause the processor to perform the step of:
solving for projective parameters and global lens distortion parameters using the set of affine parameters.

15. Apparatus for multi-view image registration comprising:
input means for receiving a plurality of images;
means for establishing an ideal coordinate system;
processing means for processing the received images to register the images to the ideal coordinate system using none of the plurality of images as a reference image, comprising:
means for selecting at least two images from the plurality of images;
means for computing a plurality of motion parameters to warp the at least two images to the ideal coordinate system as at least two warped images respectively; and
means for minimizing an objective function that characterizes differences between the at least two warped images in the ideal coordinate system by iteratively deriving the motion parameters in a coarse-to-fine manner over a set of image pyramids to produce the further set of parameters which define the parametric transformation.

16. The apparatus of claim 15, wherein the means for computing a plurality of motion parameters includes:
means for selecting one image from the at least two images;
means for deriving a first set of parameters which define a first parametric transformation that translates the one image to a position in the ideal coordinate system; and
means for deriving at least one further set of parameters which define at least one respective further parametric transformation defining a warping of the one image.

17. The apparatus of claim 15, wherein:
the means for computing the plurality of motion parameters includes means for deriving a parametric motion description comprising a number of initial parameters; and the means for iteratively deriving at least one further set of parameters includes means for iteratively deriving respective further parametric motion descriptions each motion description including an equal or greater numbers of motion parameters than are included in any previously derived motion description, using the previously derived parametric motion descriptions.

18. The apparatus of claim 17, further comprising:
means for deriving image distortion parameters using the motion parameters derived in a final iteration.

19. The apparatus of claim 17, wherein:
the means for deriving the parametric motion description comprising the number of initial parameters uses a first portion of each image, said first portion having a predetermined size, and
the means for iteratively deriving the respective further parametric motion descriptions uses a respective further portion of each image for each iteration, said further portions each having a size greater than or equal to the size of the portion used in the previous iteration.

20. A method for generating a two-dimensional output mosaic image comprising the steps of:
a) receiving a plurality of images;
b) generating a set of alignment parameters which map the pixels of the plurality of images to a single coordinate system, including the steps of:
b1) selecting at least two images from the plurality of images;
b2) computing a plurality of motion parameters to warp the at least two images to the ideal coordinate system as at least two warped images respectively; and
b3) minimizing an objective function that characterizes differences between the at least two warped images in the ideal coordinate system by iteratively deriving the motion parameters in a coarse-to-fine manner over a set of image pyramids to produce the further set of parameters which define the parametric transformation; and
c) performing two dimensional blending, responsive to the alignment parameters, to combine the plurality of images into the output mosaic image.

21. The method set forth in claim 20, wherein step b2) includes the steps of warping the plurality of images by:
performing frame-to-frame alignment; and
performing frame-to-mosaic alignment.

22. The method of claim 20 wherein the step of two dimensional blending comprises of:
a) selecting for each pixel position in the mosaic image, one of the plurality of images from which a corresponding pixel will be taken;
b) creating for each selected one of the plurality of warped images a working mosaic image comprising the selected warped image in its entirety, together with surrounding regions composed of other warped images as determined in step a);
c) creating Gaussian and Laplacian pyramids for each of said working mosaics;
d) copying pixels from each said working mosaic pyramid into an output mosaic pyramid as determined in step a); and
e) reconstructing the output mosaic by collapsing said output mosaic pyramid.

23. The method of claim 22 wherein the process of selecting one of the plurality of images from which the corresponding pixel value will be taken comprises steps of:
a) computing, based on alignment parameters relative to the output mosaic coordinate system, mapped locations corresponding to respective central portions of each image in the plurality of images; and
b) creating a Voronoi tessellation in the output mosaic coordinate system in which the said mapped locations of the centers of the respective plurality of images are sites from which distance is determined.

24. The method of claim 20, further comprising steps of estimating lens distortion and correcting each of the plurality of images to compensate for the estimated lens distortion.

25. Apparatus for generating a two dimensional output mosaic image comprising:
means for receiving a plurality of images;
means for generating a set of alignment parameters which map the pixels of the plurality of images to an ideal coordinate system to form a respective plurality of warped images including:
means for selecting at least two images from the plurality of images;
means for computing a plurality of motion parameters to warp the at least two images to the ideal coordinate system as at least two warped images respectively; and
means for minimizing an objective function that characterizes differences between the at least two warped images in the ideal coordinate system by iteratively deriving the motion parameters in a coarse-to-fine manner over a set of image pyramids to produce the further set of parameters which define the parametric transformation; and
means for performing two dimensional blending, responsive to the further set of parameters, to combine the plurality of warped images into the output mosaic image.

26. The apparatus of claim 25 wherein the means for performing two dimensional blending comprises:
means for selecting, for each pixel position in the output mosaic image, one of the plurality of images from which a corresponding pixel value will be taken;
means for creating for each selected one of the plurality of warped images a working mosaic image comprising the selected warped image in its entirety, together with surrounding regions composed of other warped images;
means for creating Gaussian and Laplacian pyramids for each of said working mosaics;
means for copying pixels from each working mosaic pyramid into an output mosaic pyramid as determined by the means for selecting; and
means for reconstructing the output mosaic by collapsing said output mosaic pyramid.

27. A method for estimating lens distortion and correcting each of the plurality of images to compensate for the estimated lens distortion comprising the steps of:
a) receiving a plurality of images containing lens distortion;
b) selecting a parametric motion description to align said plurality of images to a single coordinate system in the absence of lens distortion;
c) estimating said parametric motion descriptions for each of said images while simultaneously estimating lens distortion parameters; and
d) warping each of said images using the estimated lens distortion parameters to correct for estimated lens distortion.

* * * * *